(12) United States Patent
Chang et al.

(10) Patent No.: US 12,372,686 B2
(45) Date of Patent: Jul. 29, 2025

(54) META OPTICAL DEVICE, OPTICAL SYSTEM, AND METHOD FOR ABERRATION CORRECTION

(71) Applicant: VisEra Technologies Company Limited, Hsin-Chu (TW)

(72) Inventors: Kai-Hao Chang, Kaohsiung (TW); Shin-Hong Kuo, New Taipei (TW); An-Li Kuo, Hsin-Chu (TW); Chun-Yuan Wang, New Taipei (TW); Yu-Chi Chang, Hukou Township (TW); Chih-Ming Wang, Taoyuan (TW)

(73) Assignee: TECHNOLOGIES COMPANY LIMITED, Visera Hsin-Chu (TW)

( * ) Notice: Subject to any disclaimer, the term of this patent is extended or adjusted under 35 U.S.C. 154(b) by 53 days.

(21) Appl. No.: 17/489,188

(22) Filed: Sep. 29, 2021

(65) Prior Publication Data

US 2023/0095994 A1 Mar. 30, 2023

(51) Int. Cl.
*G02B 1/00* (2006.01)
*G02B 3/00* (2006.01)

(52) U.S. Cl.
CPC ........... *G02B 1/002* (2013.01); *G02B 3/0062* (2013.01)

(58) Field of Classification Search
CPC .. G02B 1/002; G02B 3/0062; G02B 27/0025; G02B 1/11; G02B 1/14
See application file for complete search history.

(56) References Cited

U.S. PATENT DOCUMENTS

| 8,958,141 | B1 | 2/2015 | Brown |
| 2013/0002509 | A1 | 1/2013 | Liu et al. |
| 2013/0119236 | A1 | 5/2013 | Lenchenkov |
| 2018/0224574 | A1 | 8/2018 | Lee et al. |
| 2019/0051770 | A1 | 2/2019 | Liu et al. |
| 2019/0178798 | A1 | 6/2019 | Li et al. |
| 2019/0198686 | A1 | 6/2019 | Hofrichter et al. |
| 2020/0174163 | A1* | 6/2020 | Han ................... G02B 5/189 |
| 2020/0233223 | A1 | 7/2020 | Shramkova et al. |
| 2021/0014394 | A1* | 1/2021 | Han ................... G02B 5/286 |
| 2021/0028215 | A1* | 1/2021 | Devlin ............ G02B 27/0988 |
| 2021/0103075 | A1* | 4/2021 | Park ................ G02B 5/1814 |
| 2021/0126142 | A1 | 4/2021 | Lee et al. |

(Continued)

FOREIGN PATENT DOCUMENTS

| CN | 113161763 A | 7/2021 |
| EP | 3671340 A1 | 6/2020 |

(Continued)

OTHER PUBLICATIONS

Wesemann et al. "Meta-optical and thin film devices for all-optical information processing" Aug. 19, 2021 (Year: 2021).*

(Continued)

*Primary Examiner* — Ephrem Z Mebrahtu
(74) *Attorney, Agent, or Firm* — MUNCY, GEISSLER, OLDS & LOWE, P.C.

(57) ABSTRACT

A meta optical device is provided. The meta optical device includes an array of meta structures. Each of the meta structures includes a plurality of stacked layers at least including a first layer with a first refractive index and a second layer with a second refractive index. The first refractive index and the second refractive index are different.

19 Claims, 17 Drawing Sheets

(56) References Cited

U.S. PATENT DOCUMENTS

| | | | |
|---|---|---|---|
| 2021/0132256 A1* | 5/2021 | Park | G02B 1/002 |
| 2021/0141146 A1* | 5/2021 | Melli | G02B 27/0093 |
| 2021/0149081 A1 | 5/2021 | Groever et al. | |
| 2021/0356754 A1 | 11/2021 | Li et al. | |
| 2022/0069194 A1 | 3/2022 | Lee et al. | |
| 2022/0260754 A1* | 8/2022 | Dobashi | G02B 7/02 |
| 2024/0178354 A1* | 5/2024 | Hao | H01L 25/0753 |

FOREIGN PATENT DOCUMENTS

| | | | | |
|---|---|---|---|---|
| EP | 3805813 A1 | 4/2021 | | |
| JP | 2014145982 A | 8/2014 | | |
| JP | 2021012376 A | 2/2021 | | |
| JP | 2021512365 A | 5/2021 | | |
| KR | 2021006842 A * | 1/2021 | | G02B 1/002 |
| WO | WO-2008020899 A2 * | 2/2008 | | B24B 13/06 |

OTHER PUBLICATIONS

Office Action of JP Application No. 2022-032608 issued on Jan. 10, 2023, 9 pages.

Office Action of TW Application No. 111101372 issued on Dec. 1, 2022, 8 pages.

Partial European Search Report dated May 3, 2022 in EP Application No. 2121037.2, 10 pages.

Refractive index of Si—Ge (silicon-germanium, SiGe)-Jellison-11, Dec. 31, 1993, https://refractiveindex.info/?shelf=other&book=Si-Ge&page=Jellison-11. pp. 1-3.

Refractive index of Si (Silicon)-Aspnes, Dec. 31, 1983, https://refractiveindex.info/?shelf=main&book-Si&page=Aspnes; pp. 1-3.

Refractive index of Si3N4, SiN (Silicon nitride)-Luke, Dec. 31, 2015, https://refractiveindex.info/?shelf=main&book=Si3N4&page=Luke; pp. 1-2.

Refractive index of Ag (Silver)-Johnson, Dec. 31, 1972, https://refractiveindex.info/?shelf=main&book=Ag&page=Johnson, pp. 1-3.

Refractive index of SiO2 (Silicon dioxide, Silica, Quartz)-Maltison, Dec. 31, 1965; https://refractiveindex.info/?shelf=main&book=SiO2&page=Malitson; pp. 1-3.

Refractive index of HfO2 (Hafnium dioxide, Hafnia)-Al-Kuhaili, Dec. 31, 2004, https://refractiveindex.info/?shelf=main&book=HfO2&page=Al-Kuhaili; pp. 1-2.

* cited by examiner

META OPTICAL DEVICE, OPTICAL SYSTEM, AND METHOD FOR ABERRATION CORRECTION

BACKGROUND OF THE INVENTION

Field of the Invention

The present invention relates to an optical device, and, in particular, to an optical device including metasurfaces.

Description of the Related Art

Recently, metasurfaces have garnered significant attention in the field of optics. For example, they may be used in conjunction with an image sensor such as a CMOS image sensor (CIS). CIS products may be used in digital cameras, camera phones, web cameras, notebook security devices, automobiles, and medical devices. Metasurfaces are capable of manipulating the properties of electromagnetic waves (e.g. the incident wave). For example, metasurfaces may be used as lenses, polarizers, beam-shaping devices, and tunable phase modulators. Also, metasurfaces may be designed to correct aberrations including spherical aberrations, chromatic aberrations, etc. Therefore, image quality may be enhanced.

BRIEF SUMMARY OF THE INVENTION

According to some embodiments, a meta optical device is provided. The meta optical device includes an array of meta structures. Each of the meta structures includes a plurality of stacked layers at least including a first layer with a first refractive index and a second layer with a second refractive index. The first refractive index and the second refractive index are different.

In some embodiments, the difference between the first refractive index and the second refractive index is between 0.1-2.5. Alternatively, the difference between the first refractive index and the second refractive index is between 0.3-2.0. Alternatively, the difference between the first refractive index and the second refractive index is between 0.5-1.8. In some embodiments, the meta structures include dielectric material. In some embodiments, the stacked layers further include a third layer with a third refractive index, the third refractive index is different from the second refractive index, and the second layer is located between the first layer and the third layer. In some embodiments, the second refractive index is greater than the first refractive index and the third refractive index. In some embodiments, the first refractive index is equal to the third refractive index.

In some embodiments, a first thickness of the first layer is different from a second thickness of the second layer. In some embodiments, the first thickness and a third thickness of the third layer are greater than the second thickness. In some embodiments, the first thickness is equal to the third thickness. In some embodiments, each of the meta structures has an aspect ratio of less than 10. In some embodiments, each of the meta structures has a shape that is circular, elliptical, polygonal, or hollow polygonal in a top view. In some embodiments, the meta structures are arranged into an array that is rectangular or hexagonal. In some embodiments, the meta structures include different geometries, sizes, or orientations. In some embodiments, the stacked layers further include a plurality of odd layers with the first refractive index and a plurality of even layers with the second refractive index.

According to some embodiments, an optical system is provided. The optical system includes an image sensor and a meta optical device. The image sensor includes a plurality of micro lenses and a plurality of color filters disposed below the micro lenses. The meta optical device is disposed above the color filters. The meta optical device includes an array of meta structures, and each of the meta structures includes a plurality of stacked layers including a first layer with a first refractive index and a second layer with a second refractive index. The first refractive index and the second refractive index are different.

In some embodiments, the meta optical device is disposed above the micro lenses and the color filters or between the micro lenses and the color filters. In some embodiments, the distance between the bottom surface of the meta optical device and the top surface of the image sensor is less than 10 μm, between 10 μm and 1 mm, or between 1 mm and 3 mm.

According to some embodiments, a method for aberration correction is provided. The method includes calculating a required amount for aberration correction. The method includes determining a desired position of a meta optical device that is disposed close to an image sensor (but relatively far away from the near field region), wherein the distance between the meta optical device and the image sensor is between 10 μm and 3 mm. In some other embodiments, the distance between the meta optical device and the image sensor is less than 10 μm. In some other embodiments, the meta optical device may be disposed inside the image sensor. The meta optical device includes an array of meta structures, and each of the meta structures includes a plurality of stacked layers including at least a first layer with a first refractive index and a second layer with a second refractive index, wherein the first refractive index and the second refractive index are different. The method includes adjusting geometries, sizes, or orientations of the meta structures. The method further includes placing the meta optical device according to the required amount and the desired position.

BRIEF DESCRIPTION OF THE DRAWINGS

According to some embodiments, the present disclosure can be more fully understood by the subsequent detailed description and examples with references made to the accompanying drawings.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

Figure 1A:
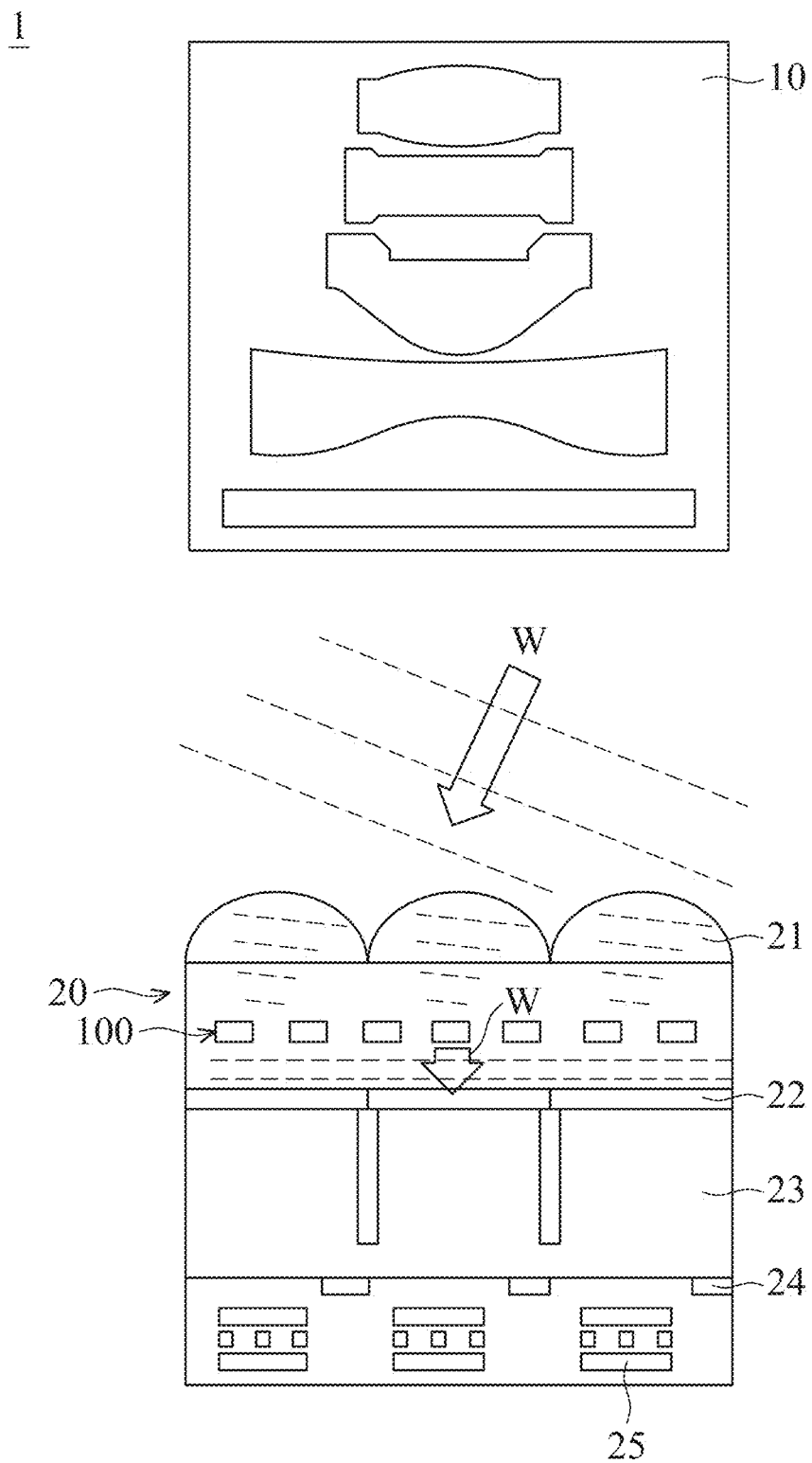
FIG. 1A to FIG. 1C schematically illustrate the positional relationship between the meta optical device and the image sensor.
Figure 1B:
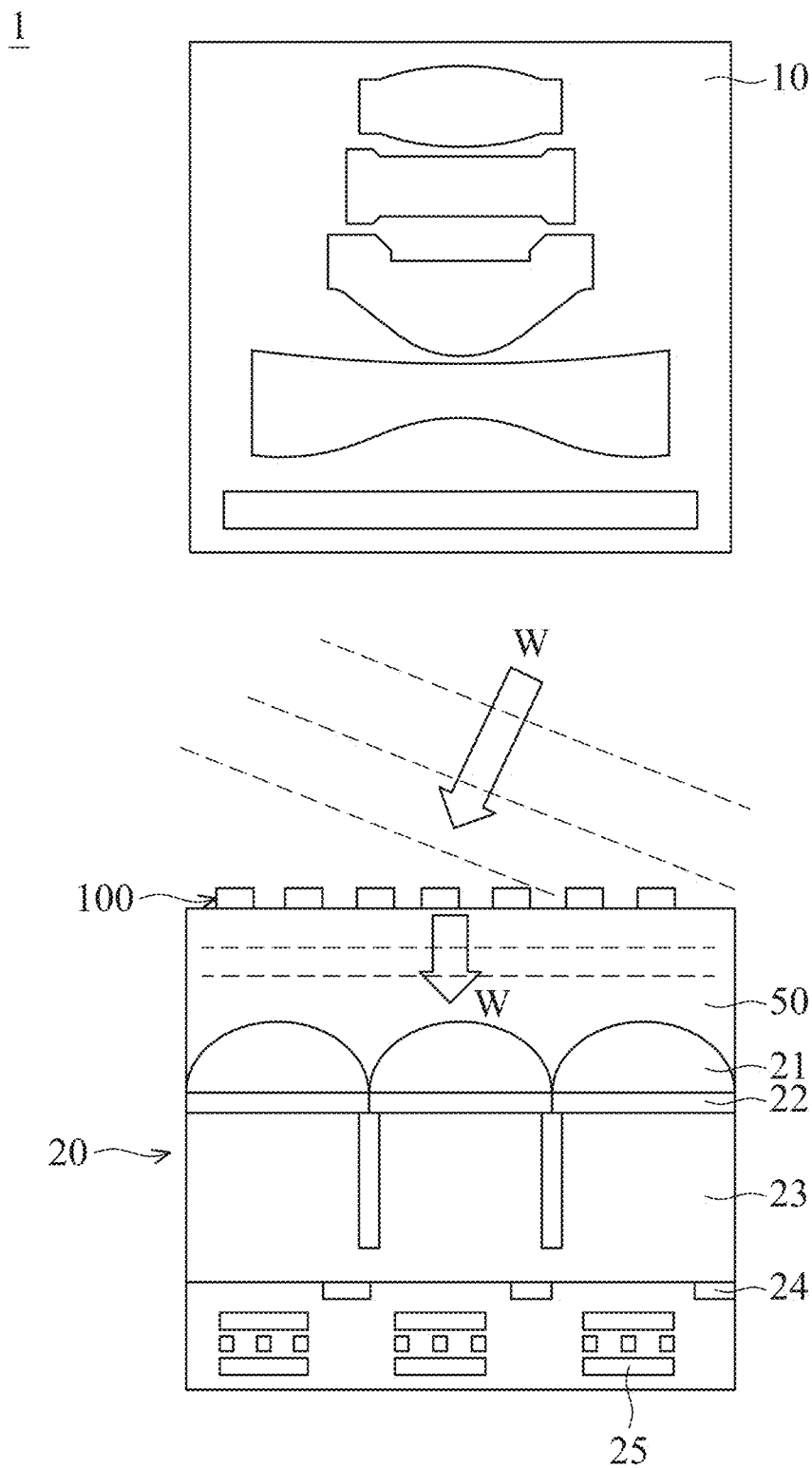
Figure 1C:
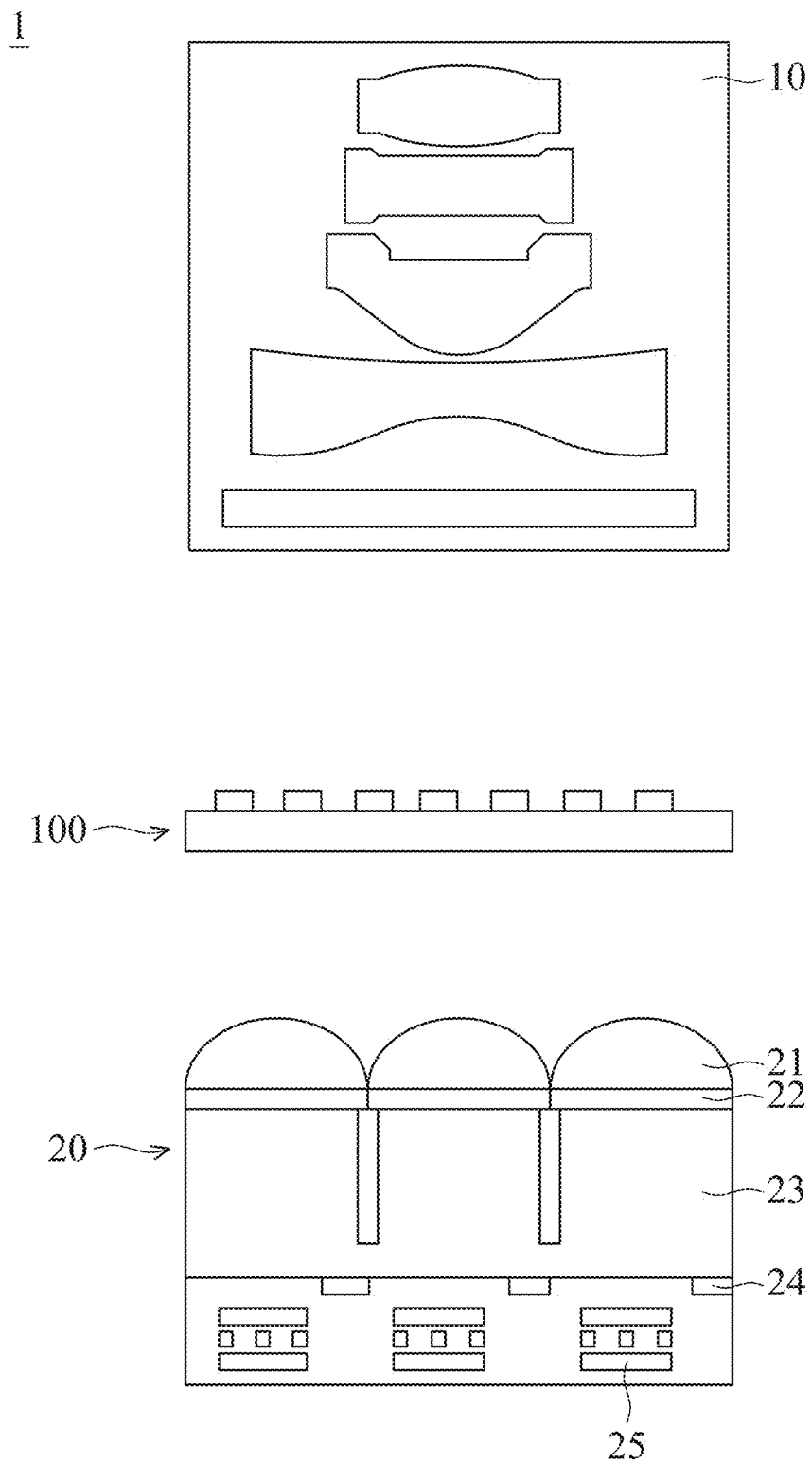

According to some embodiments, an optical system 1 is provided. The optical system 1 includes an image sensor 20 and a meta optical device 100. The image sensor 20 corresponds to a camera 10. Please refer to FIG. 1A to FIG. 1C. FIG. 1A to FIG. 1C schematically illustrate the positional relationship between the image sensor 20 and the meta optical device 100. The incident wave W passing through the camera 10 may be converted into an image on the image sensor 20. In some embodiments, the image sensor 20 may be a CIS. The image sensor 20 may include one or more micro lens 21, one or more color filter 22, one or more optical sensor layer 23, one or more isolated metal layer 24, and one or more silicon transistor 25.

As shown in FIG. 1A, the meta optical device 100 may be disposed inside the image sensor 20. In detail, in FIG. 1A, the meta optical device 100 is disposed between the micro lens 21 and the color filter 22. In other words, the meta optical device 100 is disposed below the micro lens 21 and above the color filter 22, the optical sensor layer 23, the isolated metal layer 24, and the silicon transistor 25.

As shown in FIG. 1B and FIG. 1C, the meta optical device 100 may be disposed above the image sensor 20. In detail, in FIG. 1B and FIG. 1C, the meta optical device 100 is disposed above the micro lens 21, the color filter 22, the optical sensor layer 23, the isolated metal layer 24, and the silicon transistor 25. The difference between FIG. 1B and FIG. 1C is that the meta optical device 100 is farther away from the image sensor 20 in FIG. 1C. In addition, in FIG. 1B, a filler 50 may be disposed between the meta optical device 100 and the image sensor 20.

The meta optical device 100 may provide two optical functionalities: phase correction and aberration correction. When the meta optical device 100 is used as a phase corrector, the phase of the incident wave W may be modulated. When the meta optical device 100 is used as an aberration corrector, the performance of the image sensor 20 and/or the image quality may be improved. The functionality of the meta optical device 100 may depend on its position relative to the image sensor 20.

In some embodiments, when the meta optical device 100 is disposed inside the image sensor 20, or the meta optical device 100 is disposed above the image sensor 20 within the distance less than 10 µm, the meta optical device 100 may be referred to as a phase corrector. For example, as shown in FIG. 1A and FIG. 1B, the dashed lines represent the wavefront of the incident wave W. After the incident wave W passes through the meta optical device 100, the tilted wavefront is changed to be level and be substantially parallel with the top surface of the color filter 22. That is, the phase of the incident wave W is modulated.

In some embodiments, when the meta optical device 100 is disposed above the image sensor 20, and the distance between the meta optical device 100 and the image sensor 20 is between 1 mm and 3 mm, the meta optical device 100 may be referred to as an aberration corrector. As shown in FIG. 1C, the quality of the image formed on the image sensor 20 may be enhanced due to the meta optical device 100. As for the circumstances that the distance between the meta optical device 100 and the image sensor 20 is between 10 µm and 1 mm, the meta optical device 100 may be referred to as combination of a phase corrector and an aberration corrector.

Based on actual requirements, the positional relationship between the image sensor 20 and the meta optical device 100 may be adjusted. In FIG. 1A to FIG. 1C, the optical system 1 only includes one meta optical device 100. In some other embodiments, the optical system 1 may include a plurality of meta optical devices 100, wherein some of the meta optical devices 100 are used as phase correctors while the other meta optical devices 100 are used as aberration correctors.

In the following, the same or similar elements are denoted by the same or similar symbols. Please refer to FIG. 2A to FIG. 2L. FIG. 2A to FIG. 2L schematically illustrate optical device 100A-100L. The meta optical device 100A-100L includes an array of meta structures 110A-110L. The meta structures 110A-110L may include a dielectric material, a metal material, and the like. For example, the meta structures 110A-110L may be made of carbon nanotubes (CNTs), two-dimensional transition metal dichalcogenides (2D TMDs), SiC, $ZrO_2$, $ZrO_{2-x}$, $TiO_x$, $SiN_x$, ITO, Si, a-Si, p-Si, a III-V semiconductor compound, or a combination thereof. The meta structures 110A-110L may be arranged into an array that is rectangular or hexagonal. For ease of illustration, only the rectangular arrangement is illustrated.

In the present disclosure, each of the meta structures 110A-110L includes stacked layers with different refractive indices. For example, each of the meta structures 110A-110L may include at least two layers with the highest refractive index and the second-highest refractive index, respectively. In FIG. 2A to FIG. 2L, different refractive indices are illustrated in different patterns. In some embodiments, the difference between the highest refractive index and the second-highest refractive index may be between 0.1-2.5. In some embodiments, the difference between the highest refractive index and the second-highest refractive index is between 0.3-2.0. In some embodiments, the difference between the highest refractive index and the second-highest refractive index is between 0.5-1.8. It should be noted that, the difference may be applicable to other circumstances. For example, in some embodiments, the highest refractive index and the lowest refractive index among all the refractive indices of the stacked layers may also be between 0.1-2.5, 0.3-2.0, or 0.5-1.8.

Due to different refractive indices of each of the meta structures 110A-110L, both the refraction and the absorption of the incident wave W are taken into consideration, and thus not only the image quality is enhanced but also the efficiency is improved. Details about the evaluation of the efficiency are provided in FIG. 3A to FIG. 3E. Additionally, the thickness of the multilayer meta structures 110A-110L may be reduced. In some embodiments, the aspect ratio of the multilayer meta structures 110A-110L is less than 10, which is more feasible in manufacturing due the relatively small aspect ratio. As for single-layer meta structures, if the refraction index of the single-layer meta structures is high, the absorption may be prominent, which leads to poor efficiency. If the refraction index of the single-layer meta structures is low, the thickness of the single-layer meta structures may be greater and the image quality may be poor.

Figure 2A:
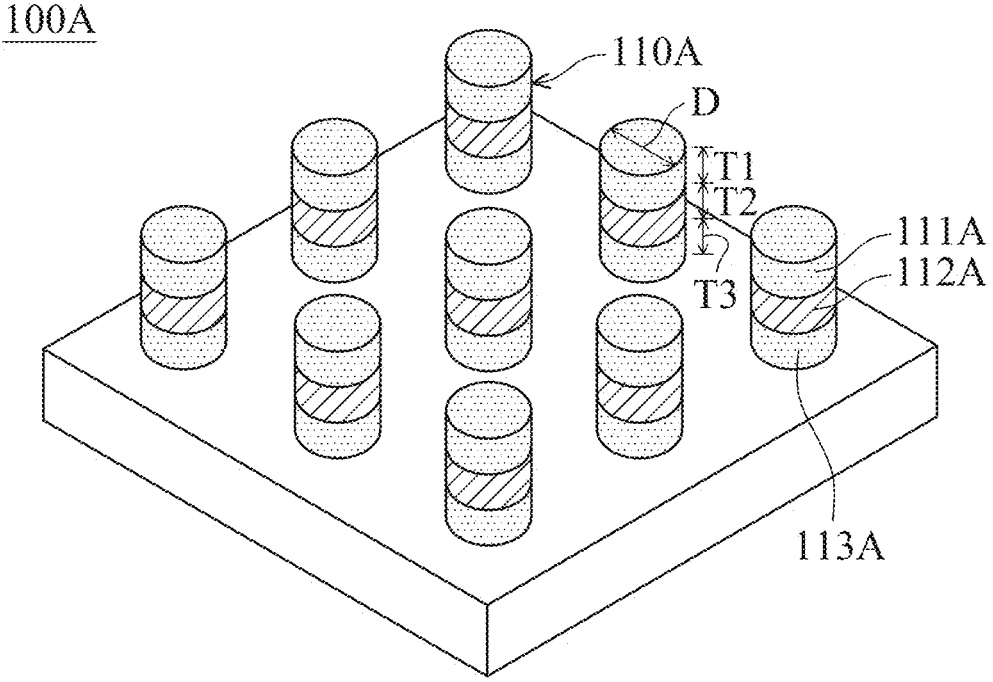
FIG. 2A to FIG. 2L schematically illustrate different meta optical devices.

In FIG. 2A, the shape of each of the meta structures 110A is circular in a top view. In some other embodiments, the shape of each of the meta structures 110A may be elliptical in a top view. Each of the meta structures 110A includes a first layer 111A, a second layer 112A, and a third layer 113A. The second layer 112A is located between the first layer 111A and the third layer 113A. The first layer 111A has a first refractive index. The second layer 112A has a second refractive index. The first refractive index and the second refractive index are different. The third layer 113A has a third refractive index. In some embodiments, the second refractive index of the second layer 112A is greater than the first refractive index of the first layer 111A. In some embodiments, the first refractive index of the first layer 111A is equal to the third refractive index of the third layer 113A.

In some embodiments, the difference between the first refractive index of the first layer 111A and the second refractive index of the second layer 112A may be between 0.1-2.5, such as 2.0. In some embodiments, the difference between the first refractive index of the first layer 111A and the second refractive index of the second layer 112A may be between 0.3-2.0, such as 1.7. In some embodiments, the difference between the first refractive index of the first layer 111A and the second refractive index of the second layer 112A may be between 0.5-1.8, such as 0.5.

The first layer 111A has a first thickness T1. The second layer 112A has a second thickness T2. The third layer has a third thickness T3. In some embodiments, the first thickness T1 is different from the second thickness T2. In some embodiments, the first thickness T1 is greater than the second thickness T2. In some embodiments, the first thickness T1 is equal to the third thickness T3. The sum of the first thickness T1, the second thickness T2, and the third thickness T3 may be less than 1 μm, such as 700 nm. The diameter D of each of the meta structures may be less than the wavelength range of interest, such as 120 nm. The aspect ratio may be defined as (T1+T2+T3)/D, and the aspect ratio may be less than 10, as described above.

Figure 2B:
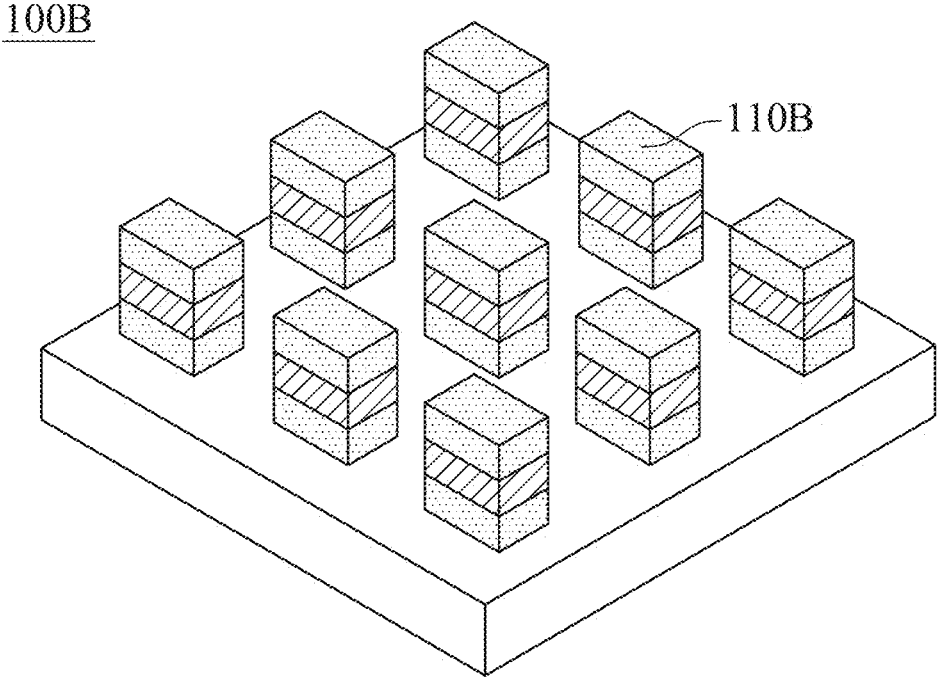
Figure 2C:
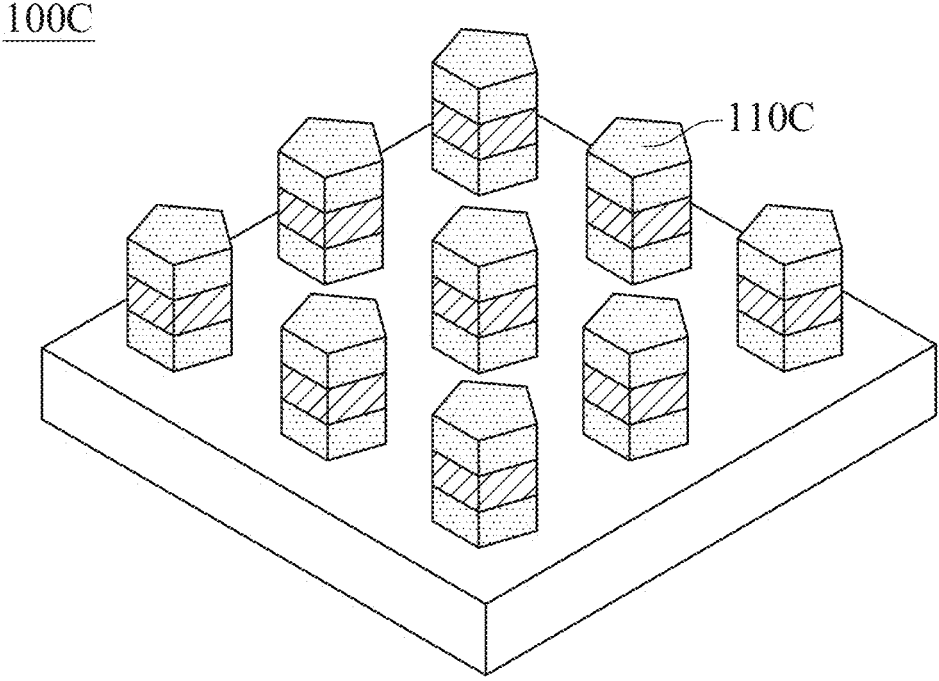
Figure 2D:
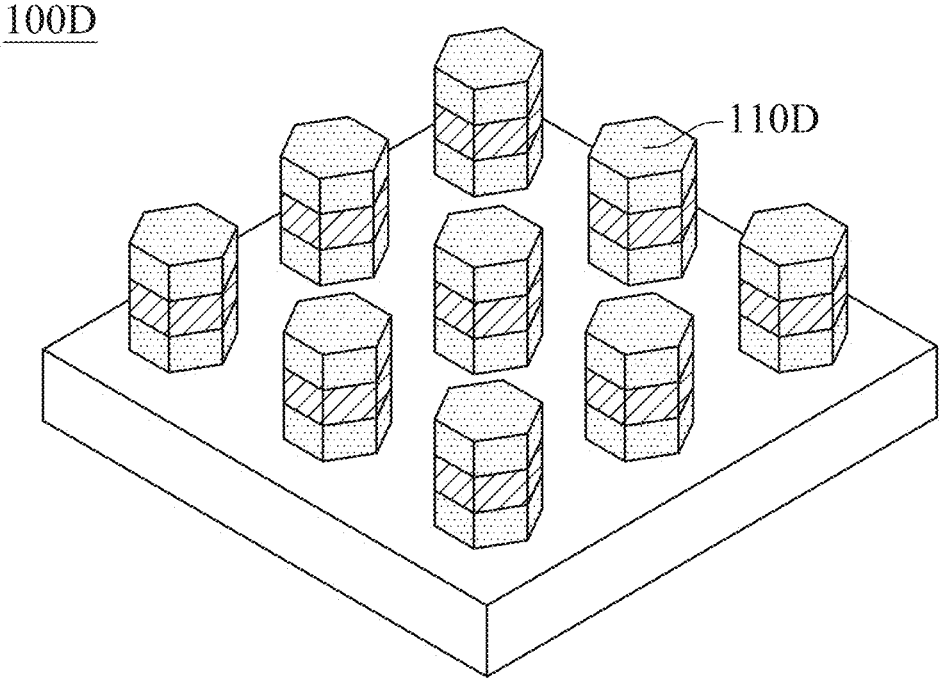

In FIG. 2B to FIG. 2D, similar to FIG. 2A, each of the meta structures 110B-110D includes three layers, while for each of the meta structures 110B-110D, the shape is different. In FIG. 2B, the shape of each of the meta structures 110B is rectangular in a top view. In FIG. 2C, the shape of each of the meta structures 110C is pentagonal in a top view. In FIG. 2D, the shape of each of the meta structures 110D is hexagonal in a top view.

Figure 2E:
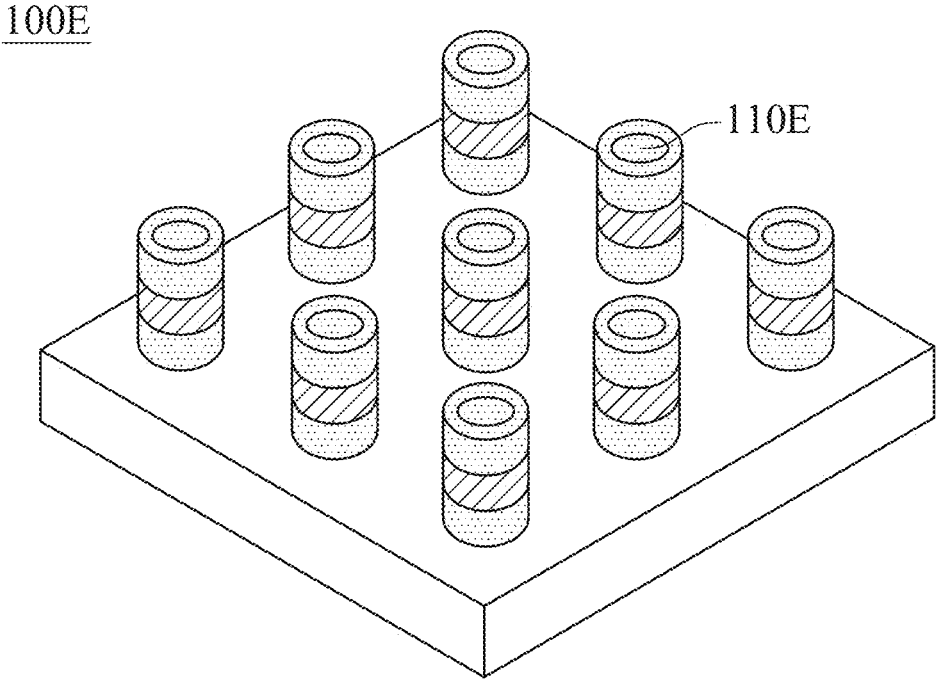
Figure 2F:
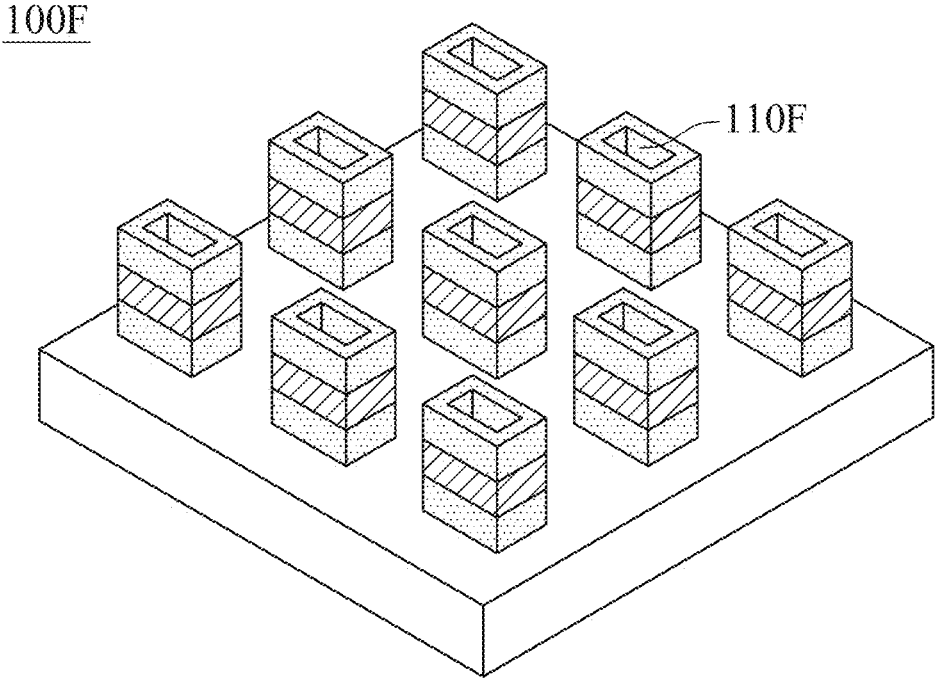
Figure 2G:
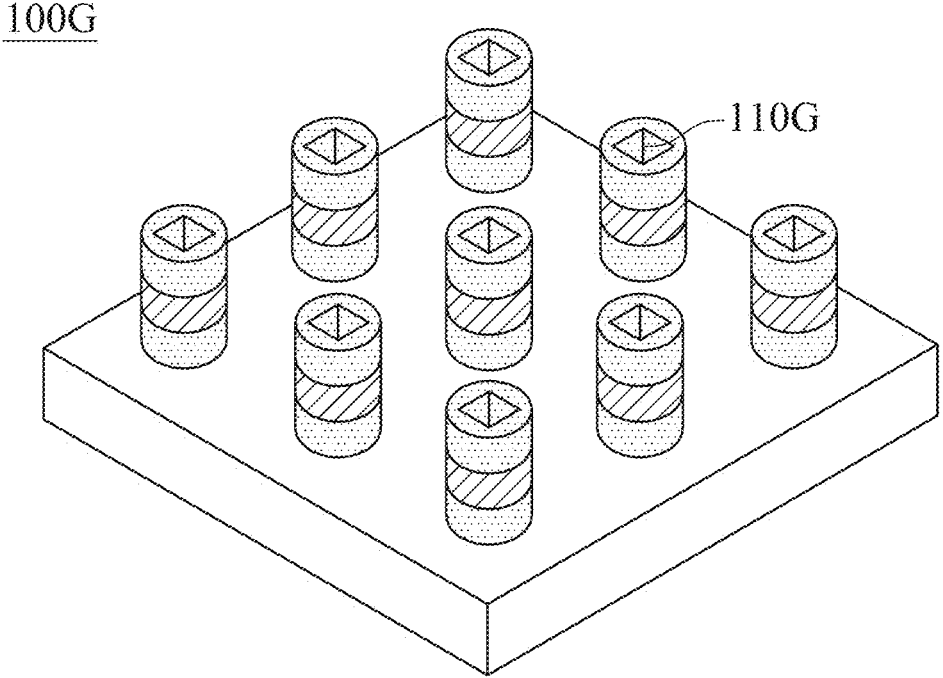
Figure 2H:
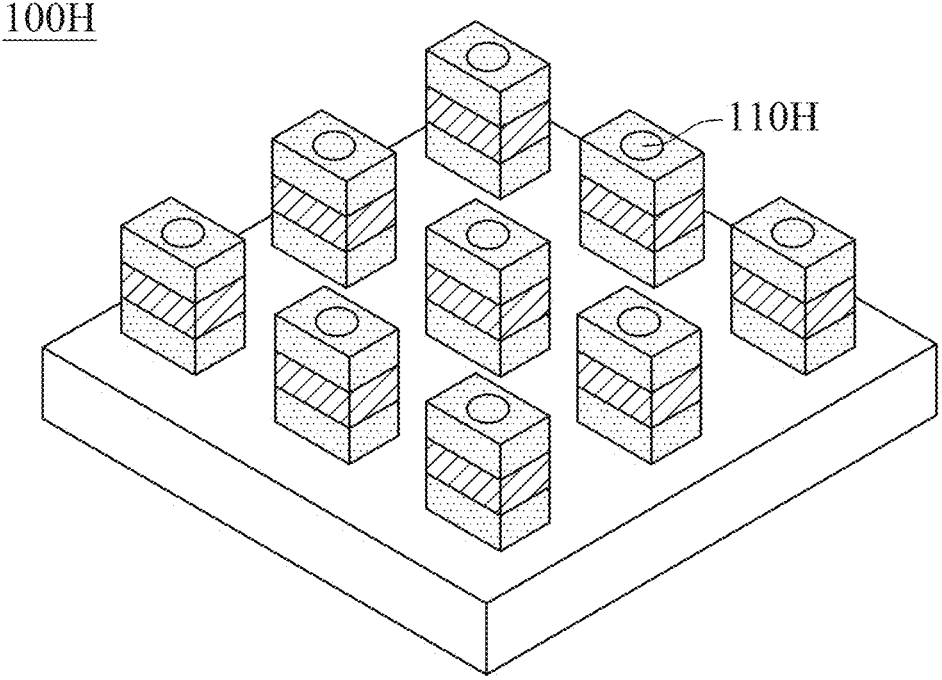

In FIG. 2E to FIG. 2H, each of the meta structures 110E-110H is a hollow structure. In FIG. 2E, each of the meta structures 110E is a cylinder with a cylindrical bore inside, and thus the shape of each of the meta structures 110E is circular with a circular hole inside in a top view. In FIG. 2F, each of the meta structures 110F is a cuboid with a cuboid bore inside, and thus the shape of each of the meta structures 110F is rectangular with a rectangular hole inside in a top view. In FIG. 2G, each of the meta structures 110G is a cylinder with a cuboid bore inside, and thus the shape of each of the meta structures 110G is circular with a rectangular hole inside in a top view. In FIG. 2H, each of the meta structures 110H is a cuboid with a cylindrical bore inside, and thus the shape of each of the meta structures 110H is rectangular with a circular hole inside in a top view.

Figure 2I:
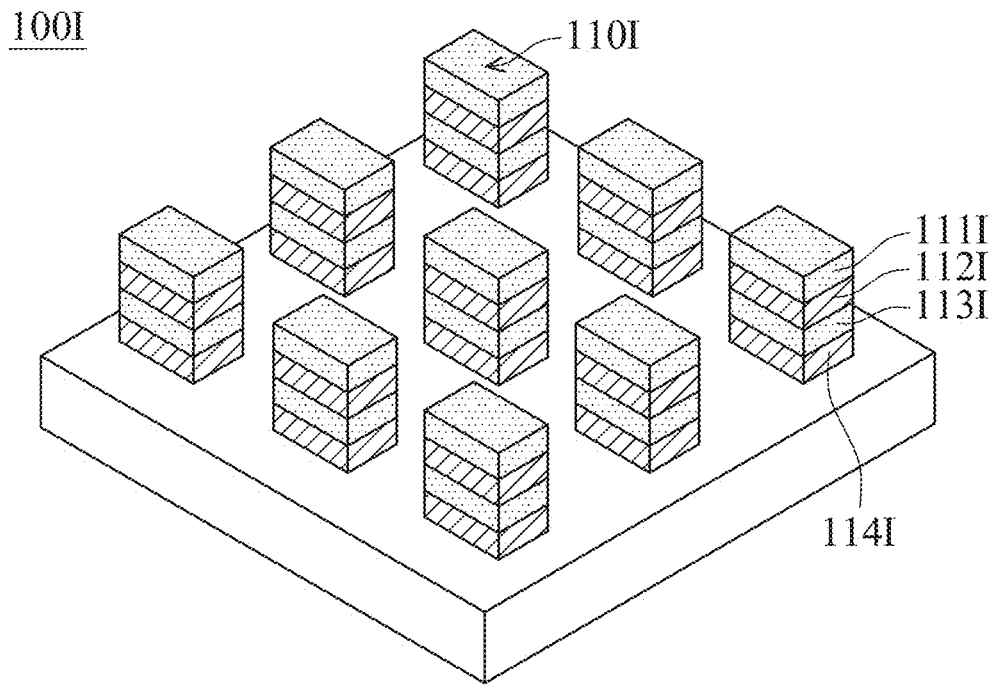
Figure 2J:
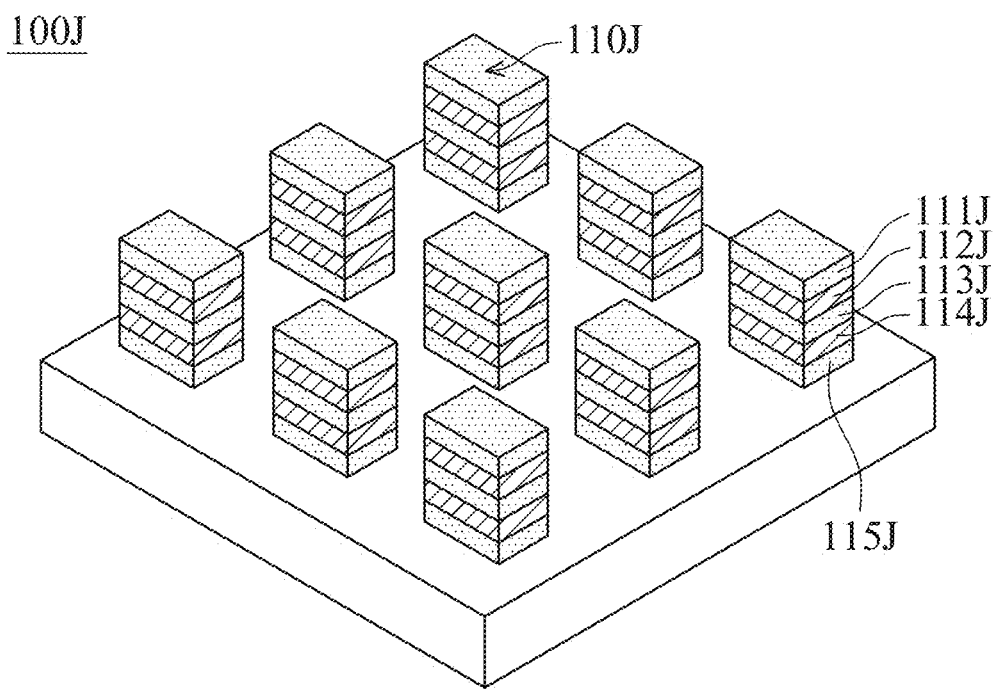

In addition, the meta structures may include more than three layers, such as the meta structures 110I-110L shown in FIG. 2I to FIG. 2L. The greater the number of layers, the lesser the overall thickness of the meta structures. In FIG. 2I, each of the meta structures 110I includes four layers 111I-114I. In FIG. 2J, each of the meta structures 110J includes five layers 111J-115J. In FIG. 2I and FIG. 2J, the odd layers (i.e. the layers 111I and 113I, or the layers 111J, 113J, and 115J) have the same refractive indices while the even layers (i.e. the layers 112I and 114I, or the layers 112J and 114J) have the same refractive indices that are different from the refractive indices of the odd layers. That is, each of the meta structures 110I and 110J has two different refractive indices in an alternate arrangement.

Figure 2K:
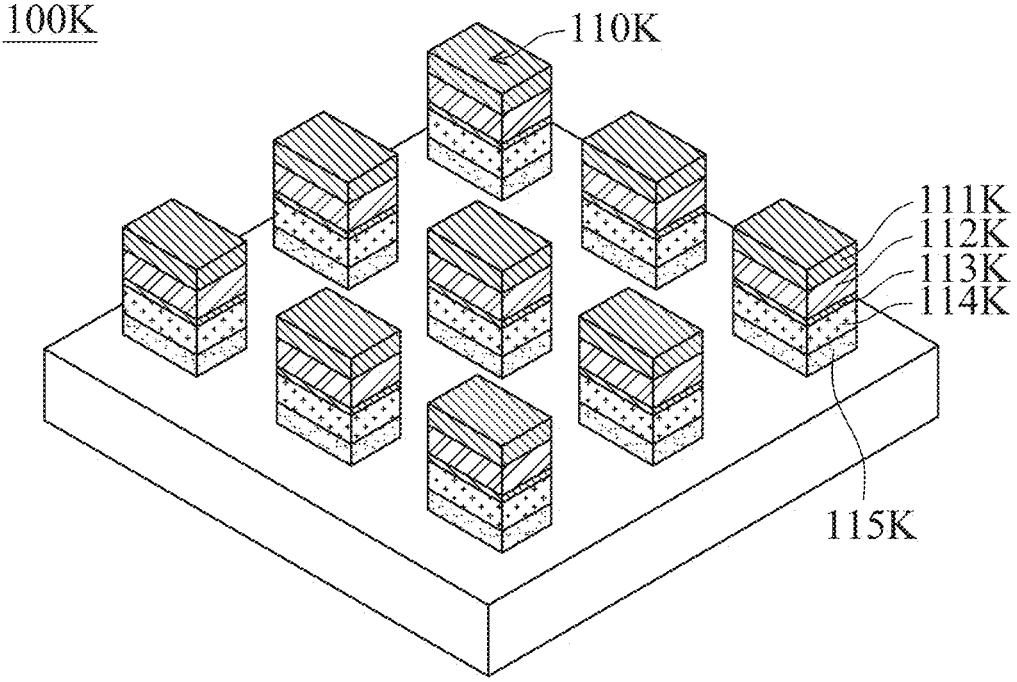
Figure 2L:
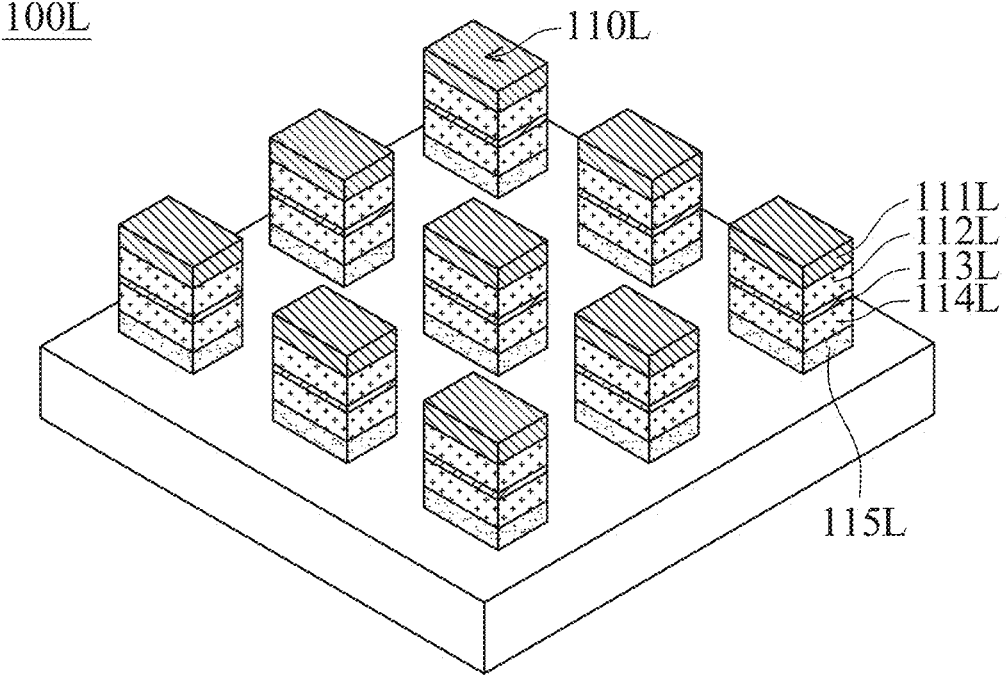

In FIG. 2K and FIG. 2L, each of the meta structures 110K and 110L includes five layers 111K-115K and 111L-115L with more than two different refractive indices. For example, in FIG. 2K, the layer with the highest refractive index is the second-highest layer 112K, and the layers adjacent to the second-highest layer 112K (i.e. the highest layer 111K and the third-highest layer 113K) have different refractive indices. That is, each of the meta structures 110K has more than two different refractive indices in an irregular arrangement. In FIG. 2L, the layer with the highest refractive index is the third-highest layer 113L, and the layers adjacent to the third-highest layer 113L (i.e. the second-highest layer 112L and the fourth-highest layer 114L) have the same refractive indices. In addition, the thickness of the layer 112K is different from that of the layers adjacent to the layer 112K (i.e. the layer 111K and the layer 113K).

To sum up, the shapes of each of the meta structures (e.g. the meta structures 110A-110L), the thickness of each layer of each of the meta structures, the number of the layers of each of the meta structures, the difference between the refractive indices, the number of refractive indices, and the arrangement of layers with different refractive indices of the meta structures may be adjusted. In some embodiments, the shapes of each of the meta structures may be circular, elliptical, polygonal, or hollow polygonal in a top view. In some embodiments, the thickness of each of the stacked layers may be controlled. In some embodiments, the thickness of the layer with lower refractive index may be greater than the thickness of the layer with higher refractive index. In some embodiments, there may be two or more layers. In some embodiments, if the number of layers increases, the total thickness of the meta structures is reduced. In some embodiments, the difference between the refractive indices may be between 0.1-2.5. In some embodiments, each of the meta structures includes two or more refractive indices. In some embodiments, the layers with the same refractive indices are in an alternate arrangement or an irregular arrangement.

Next, please refer to FIG. 3A to FIG. 3E. FIG. 3A to FIG. 3E schematically illustrate the relationship between the efficiency and the wavelength of the incident wave for some different meta structures. In order to choose suitable meta structures, the standard may be arbitrarily set. For example, the efficiency standard may be set above a specific value to find out the applicable range and/or the particular value of the wavelength range of interest for various applications. For example, the specific value of the efficiency standard may be set above 0.6, 0.8, 0.9, etc, but is not limited thereto. The specific value of the efficiency standard may be set according to actual requirements, such as the performance requirements of the meta optical device. In some embodiments, when the range of the wavelength of the incident wave is viewed as an applicable range, the efficiency is steadily higher than 0.6, but is not limited thereto. In some embodiments, the particular value of the wavelength may be determined according to the highest efficiency.

Figure 3A:
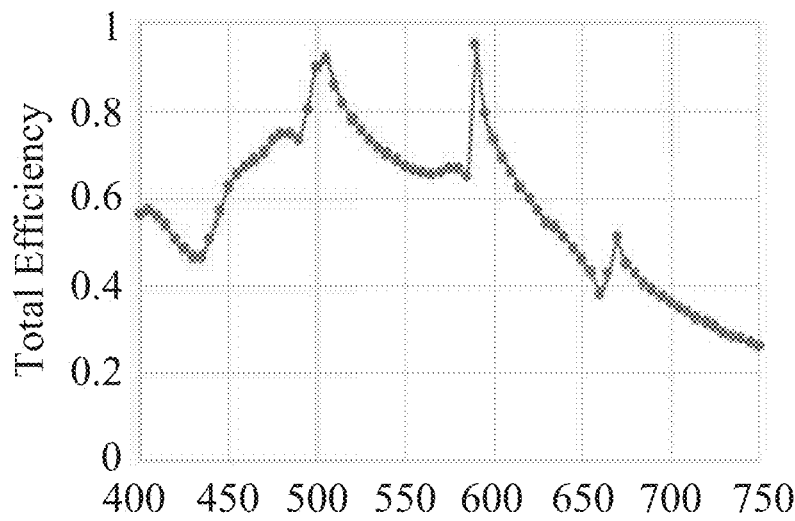
FIG. 3A to FIG. 3E schematically illustrate the relationship between the efficiency and the wavelength of the incident wave for some different meta structures.
Figure 3B:
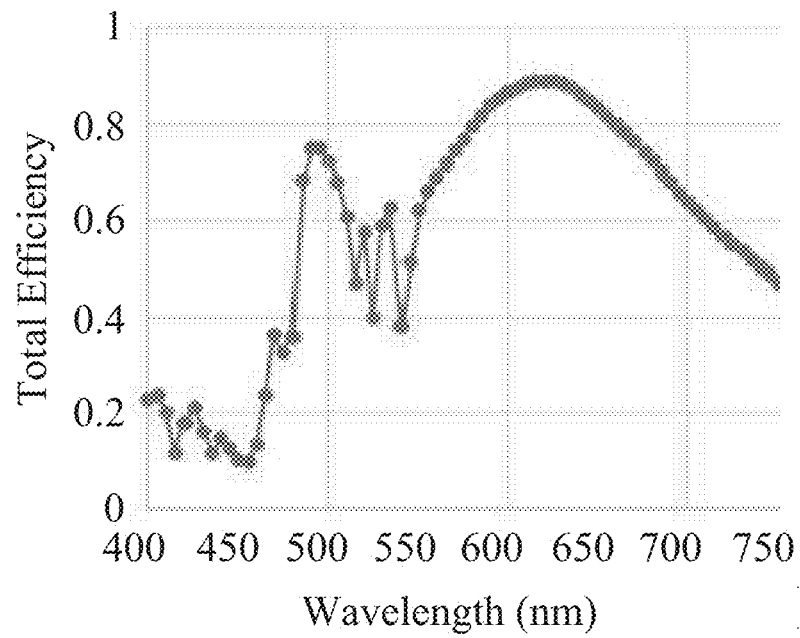
Figure 3C:
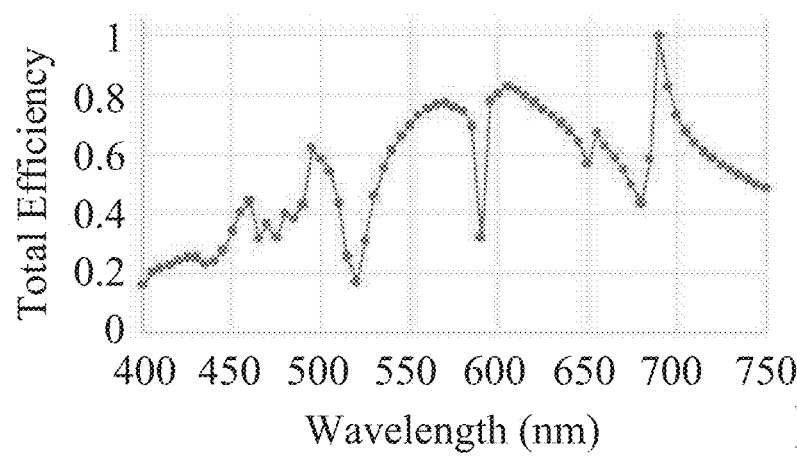

FIG. 3A to FIG. 3C may be used for evaluating the effects of the difference between the refractive indices. In detail, FIG. 3A to FIG. 3C may be obtained from meta structures with all the same parameters except for the difference between the highest refractive index and the second-highest refractive index. For example, the difference between the highest refractive index and the second-highest refractive index may be the greatest in FIG. 3A and may be the least in FIG. 3C. For example, the difference between the highest refractive index and the second-highest refractive index may be about 0.5, about 1.7, and about 2.0 in FIG. 3A, FIG. 3B, and FIG. 3C, respectively, but is not limited thereto.

In some embodiments, FIG. 3A has the widest applicable range of the wavelength of the incident wave among FIG. 3A to FIG. 3C. For example, if the standard is set above 0.6, then the applicable range of the wavelength of the incident wave may be between about 450 nm-620 nm, 550 nm-700 nm, 530 nm-580 nm in FIG. 3A, FIG. 3B, and FIG. 3C, respectively. On the other hand, if the incident wave has only a single incident wavelength, then the particular value of the wavelength of the incident wave may be about 580 nm, 620 nm, and 690 nm in FIG. 3A, FIG. 3B, and FIG. 3C, respectively.

Figure 3D:
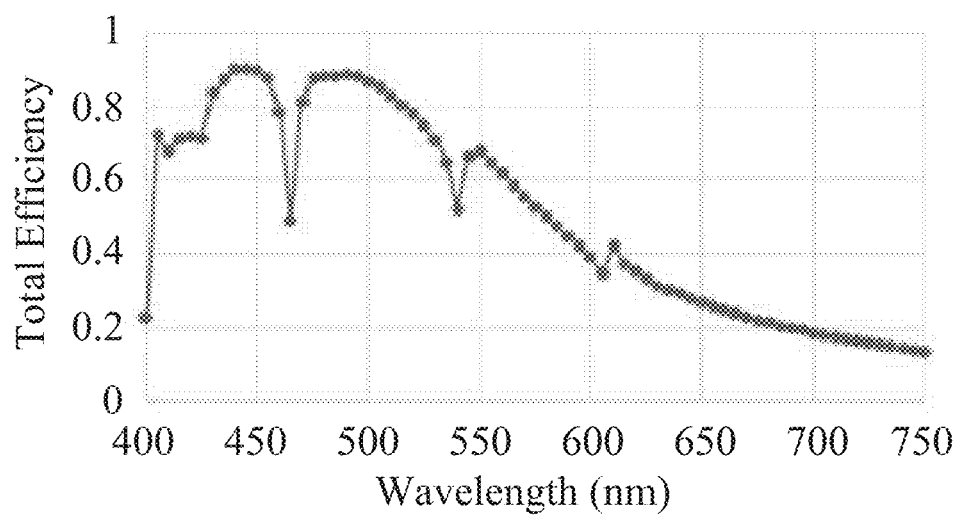
Figure 3E:
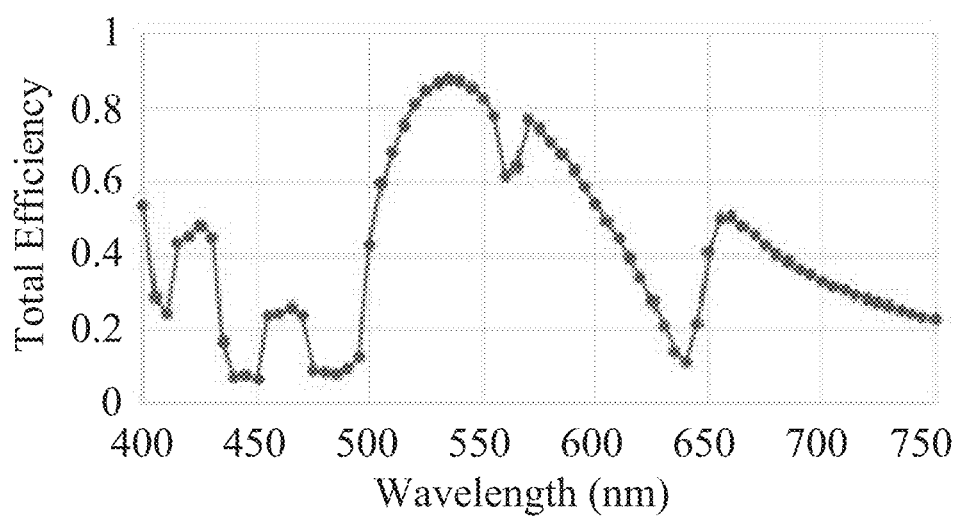

FIG. 3D and FIG. 3E may be used for evaluating the effects of the arrangement of the stacked layers of the meta structures. In detail, FIG. 3D and FIG. 3E may be obtained from meta structures with all the same parameters except for the position of the layer with the highest refractive index. For example, the layer with the highest refractive index may be the second-highest layer in FIG. 3D and may be the third-highest layer in FIG. 3E, such as the meta structures 110K and 110L illustrated in FIG. 2K and FIG. 2L, but is not limited thereto. As shown in FIG. 3D and FIG. 3E, the applicable range and the particular value of the wavelength of the incident wave are different. For example, if the standard is set above 0.6, then the applicable range of the wavelength of the incident wave may be between about 410 nm-470 nm and 500 nm-600 nm in FIG. 3D and FIG. 3E, respectively. On the other hand, if the incident wave has only a single incident wavelength, then the particular value of the wavelength of the incident wave may be about 450 nm and 540 nm in FIG. 3D and FIG. 3E, respectively.

To sum up, based on actual requirements, such as the wavelength range of interest for various applications (for example, visible light covers the range of wavelengths from about 400 nm-750 nm), the required efficiency, and the like, the suitable meta structures may be chosen.

Figure 4A:
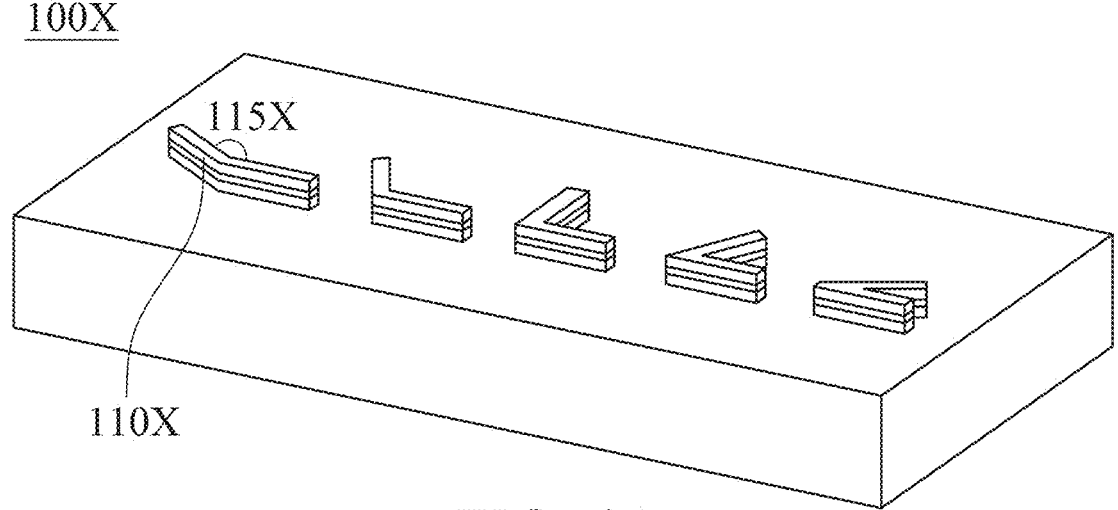
FIG. 4A schematically illustrates the geometrical variation of the meta structures.
Figure 4B:
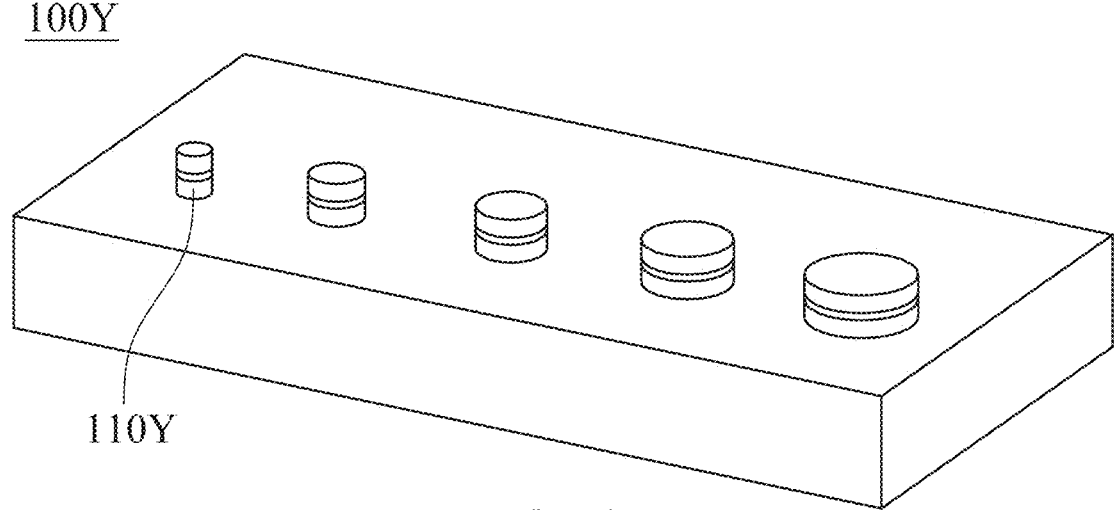
FIG. 4B schematically illustrates the size variation of the meta structures.
Figure 4C:
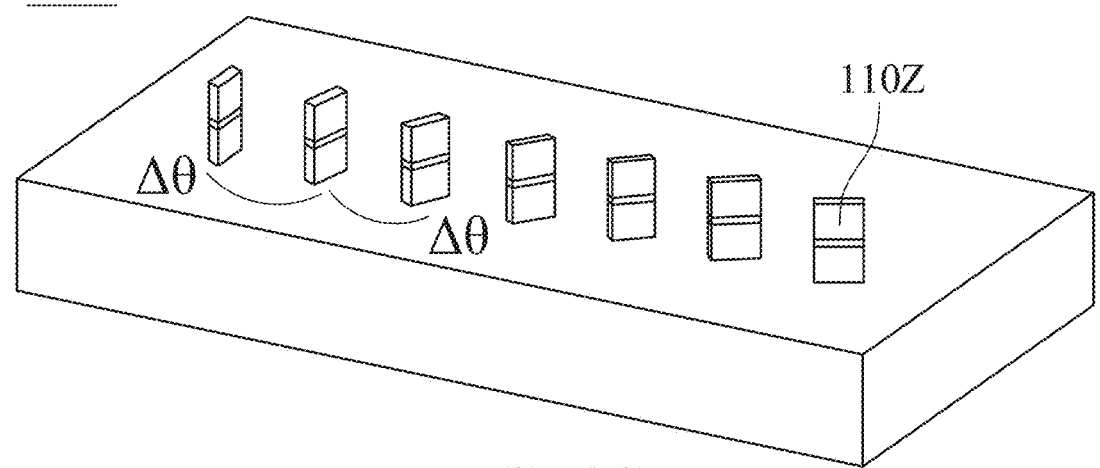
FIG. 4C schematically illustrates the orientation variation of the meta structures.

Furthermore, in some embodiments, the geometries, the sizes, and the orientations of the meta structures may vary. Please refer to FIG. 4A to FIG. 4C. For ease of illustration, meta structures 110X-110Z of meta optical devices 100X-100Z in FIG. 4A to FIG. 4C are three-layer structures, but is not limited thereto. FIG. 4A schematically illustrates the geometrical variation of the meta structures 110X. As shown in FIG. 4A, each of the meta structures 110X have two sides with different included angles 115X. FIG. 4B schematically illustrates the size variation of the meta structures 110Y. As shown in FIG. 4B, the meta structures 110Y gradually enlarge, such that the largest meta structure 110Y is located in the peripheral area of the array of the meta structures 110Y. In some other embodiments, the largest meta structure 110Y is located in the central area rather than the peripheral area of the array of the meta structures 110Y. FIG. 4C schematically illustrates the orientation variation of the meta structures 110Z. As shown in FIG. 4C, each of the meta structures 110Z may have the same geometries and sizes but have spatially varying orientations. In some embodiments, each meta structure 110Z is rotated by the same amount (a further $\Delta\theta$ degrees) from the previous, adjacent meta structure 110Z in line. In some embodiments, $\Delta\theta$ may be the factor of 360 degrees. For example, $\Delta\theta$ may be 15 degrees, 30 degrees, 45 degrees, etc.

Figure 4D:
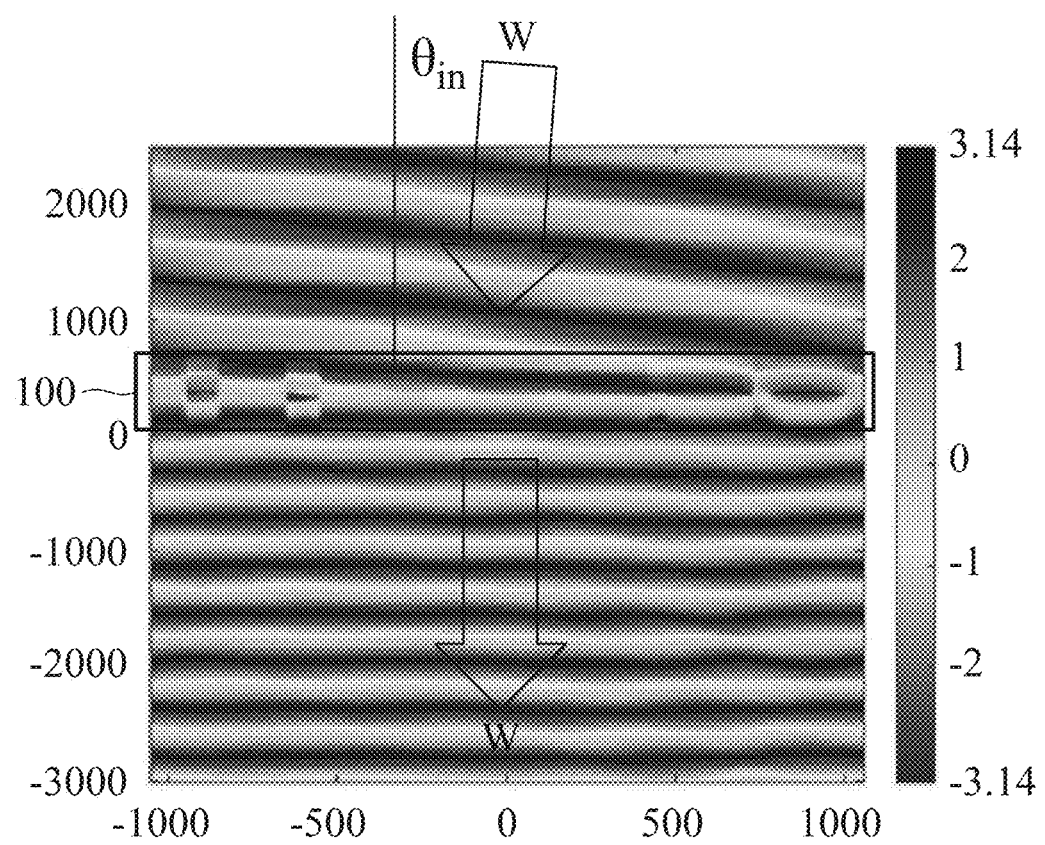
FIG. 4D schematically illustrates the phase change of an incident light with an incident angle of about 15 degrees.

By tailoring the geometries, the sizes, and the orientations of the meta structures (e.g. the meta structures 110A-110L and the meta structures 110X-110Z), the bending of the incident wave may be controlled in arbitrary ways. Please refer to FIG. 4D. FIG. 4D schematically illustrates the phase change of the incident wave W with the incident angle $\theta_{in}$ about 15 degrees. As shown in FIG. 4D, due to the meta optical device 100 of the present disclosure, the wavefront of the incident wave W is modulated. It should be noted that the incident angle $\theta_{in}$ of the incident wave W is merely an example. The phase correction of the incident wave W with nearly any incident angle may be achieved. Under such circumstances, the meta optical device 100 is used as a phase corrector. Compared to the central area of the optical system 1, the incident angle $\theta_{in}$ may be relatively larger in the peripheral area of the optical system 1. Therefore, to correct the larger incident angle $\theta_{in}$, the number of optical devices 100 disposed in the peripheral area of the optical system 1 may be greater than the number of optical devices 100 disposed in the central area of the optical system 1.

Figure 5A:
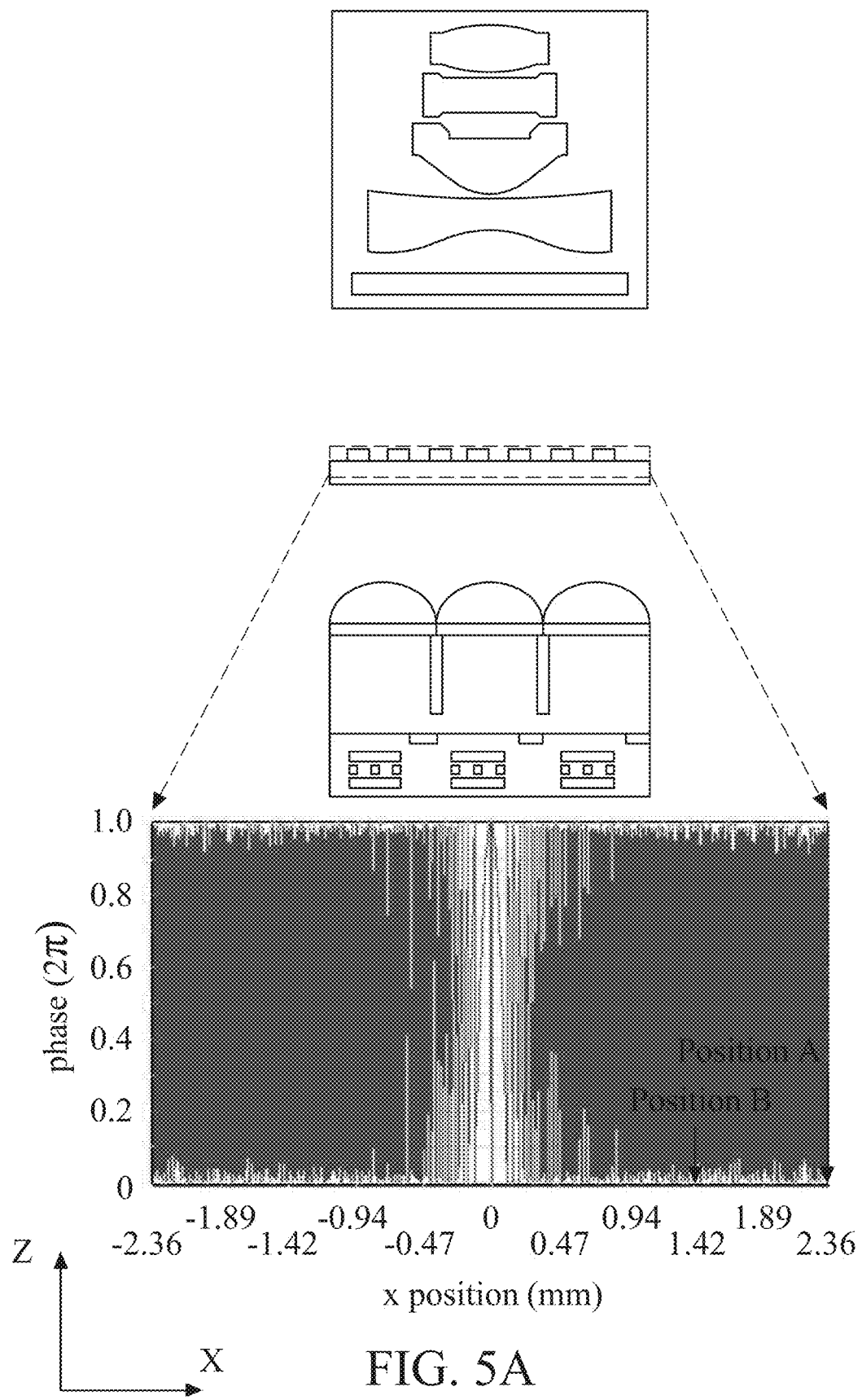
FIG. 5A to FIG. 5C schematically illustrate the simulation for conducting aberration correction.
Figure 5B:
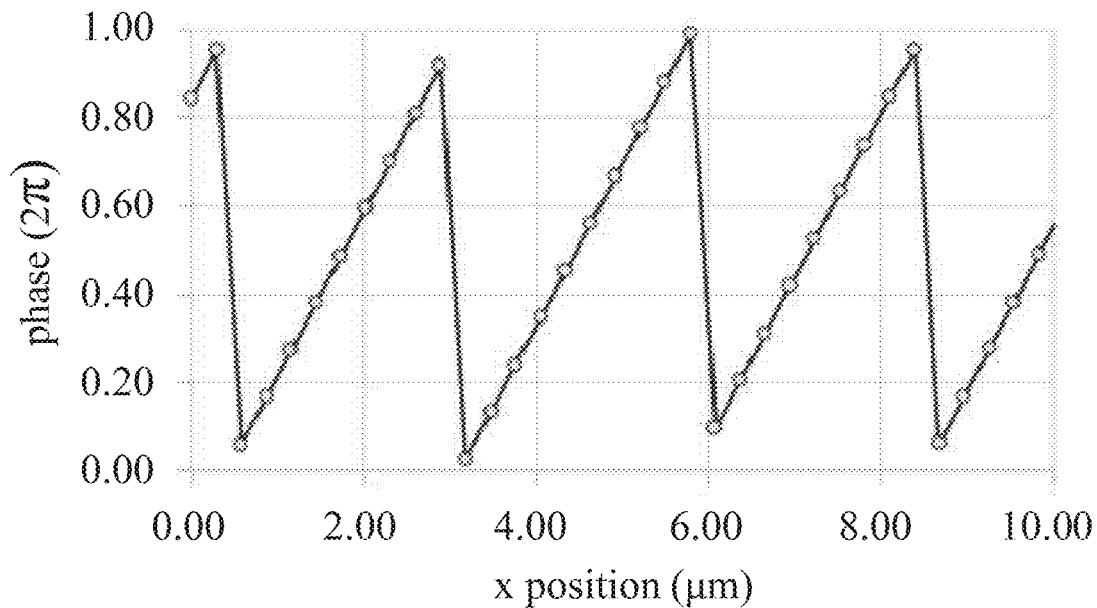
Figure 5C:
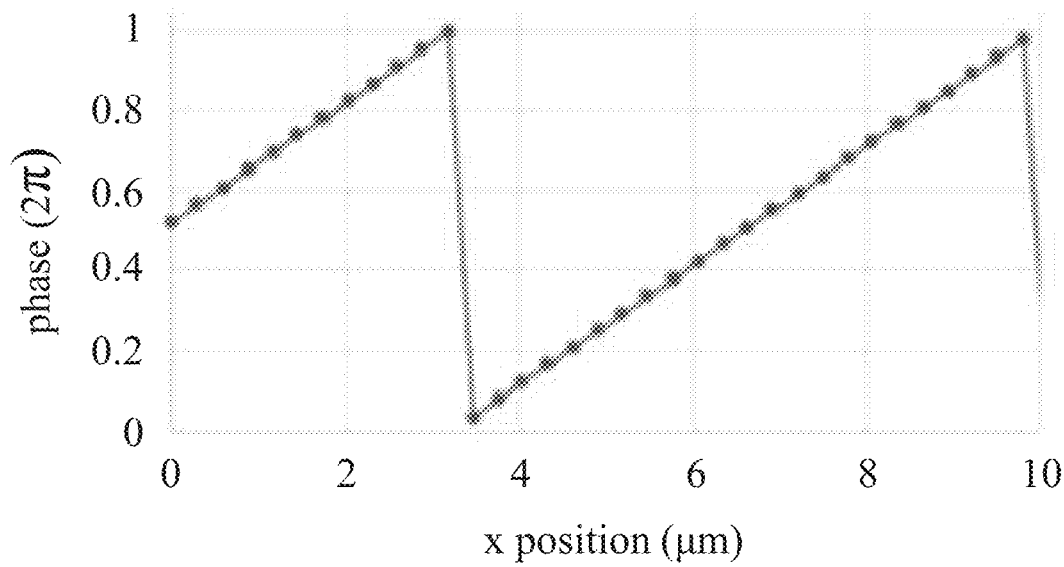
Figure 5D:
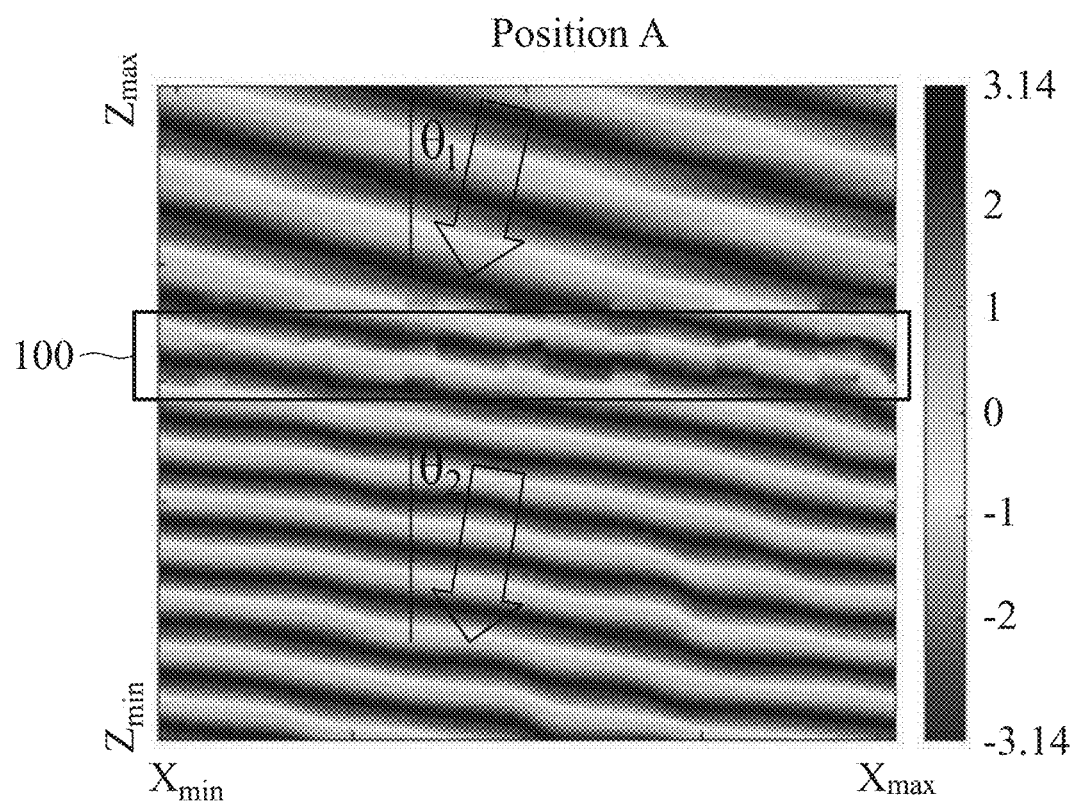
FIG. 5D and FIG. 5E schematically illustrate the results of aberration correction of the incident wave.
Figure 5E:
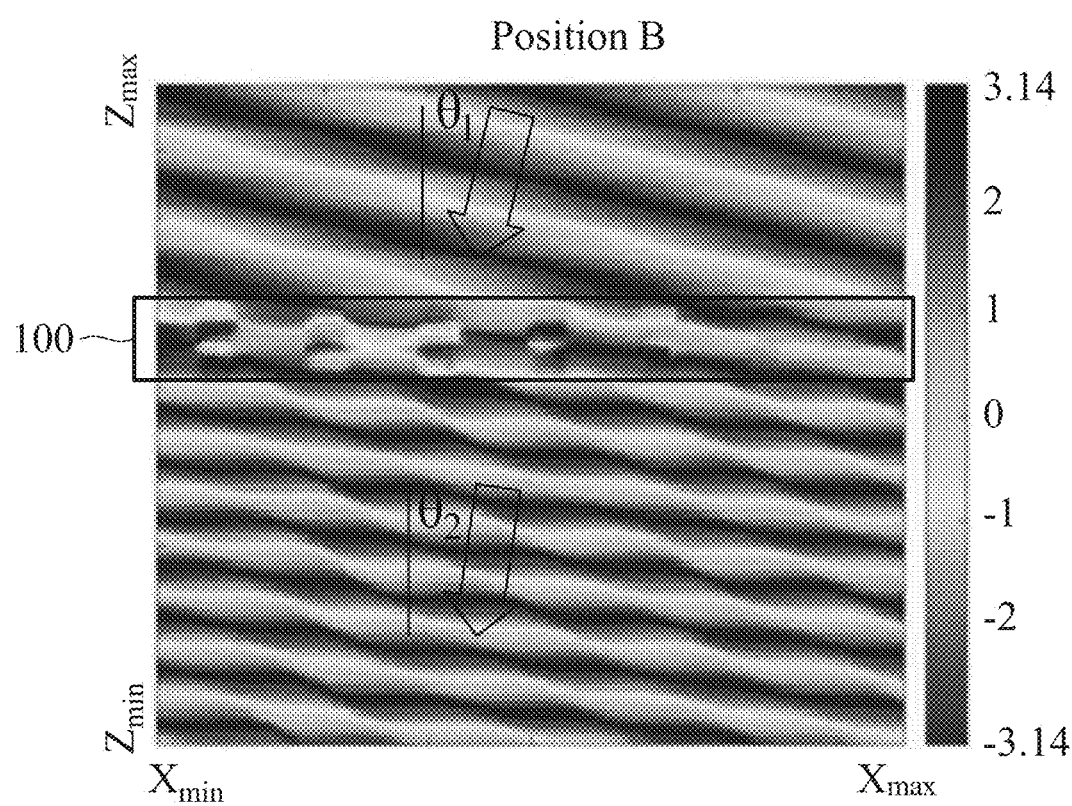

Next, please refer to FIG. 5A to FIG. 5E to understand how the meta optical device 100 is used as an aberration corrector. In detail, the meta structures of the meta optical device may correct aberrations, for example, the dispersion of the meta structures may correct aberrations. FIG. 5A to FIG. 5C schematically illustrate the simulation for reducing aberration. FIG. 5D and FIG. 5E schematically illustrate the results of aberration correction of the incident wave W. In the following and in FIG. 5A to FIG. 5E, the original incident angle $\theta_1$ of the incident wave W is set to 35 degrees, and the corrected angle $\theta_2$ of the wave exiting the metal optical device 100 is set to 20 degrees as the basis for simulation, but it's merely an example. The phase change of the incident wave W with nearly any incident angle and any corrected angle may be achieved. It should be noted that, the camera 10 may also include one or more module lens designed to correct aberrations. Based on the present disclosure, the module lens(es) in the camera 10 may need not be designed to correct all types of aberrations. In some embodiments, the meta optical device 100 may correct aberrations individually. In some embodiments, both the meta optical device 100 and the module lens(es) in the camera 10 are able to correct aberrations. For example, some aberrations (e.g. higher order aberrations (HOAs)) are corrected through the meta optical device 100, and the rest of aberrations are corrected through the module lens(es) in the camera 10. Therefore, manufacturing flexibility may be enhanced. Additionally or alternatively, manufacturing costs may be reduced, and the dimension of the module lens(es) and/or the whole camera 10 may also be reduced, thereby achieving miniaturization.

As shown in FIG. 5A, the X-axis (x position) represents the distance between the position and the midpoint, and the Y-axis (phase) represents the required amount for aberration correction. That is, for any arbitrary position, the required amount for aberration correction may be calculated and determined. Also, the position may also be determined and thus may be referred to as the desired position. In some embodiments, the distance between the desired position of the meta optical device and the image sensor is between 10 μm and 3 mm, such as between 1 mm and 3 mm.

FIG. 5B and FIG. 5C are enlarged views of FIG. 5A to illustrate the required amount for aberration correction at Position A and Position B. The unit of the position in FIG. 5A is illustrated in millimeters while the unit of the position in FIG. 5B and FIG. 5C is illustrated in micrometers. In addition, the geometries, the sizes, or the orientations of the meta structures may also be adjusted to assist to achieve aberration correction. As shown in FIGS. 5D and 5E, after the required amount for aberration correction for the desired position (e.g. Position A and Position B in FIG. 5A) is determined, the meta optical device 100 may be placed at the desired position to achieve the required aberration correction.

Figure 6:
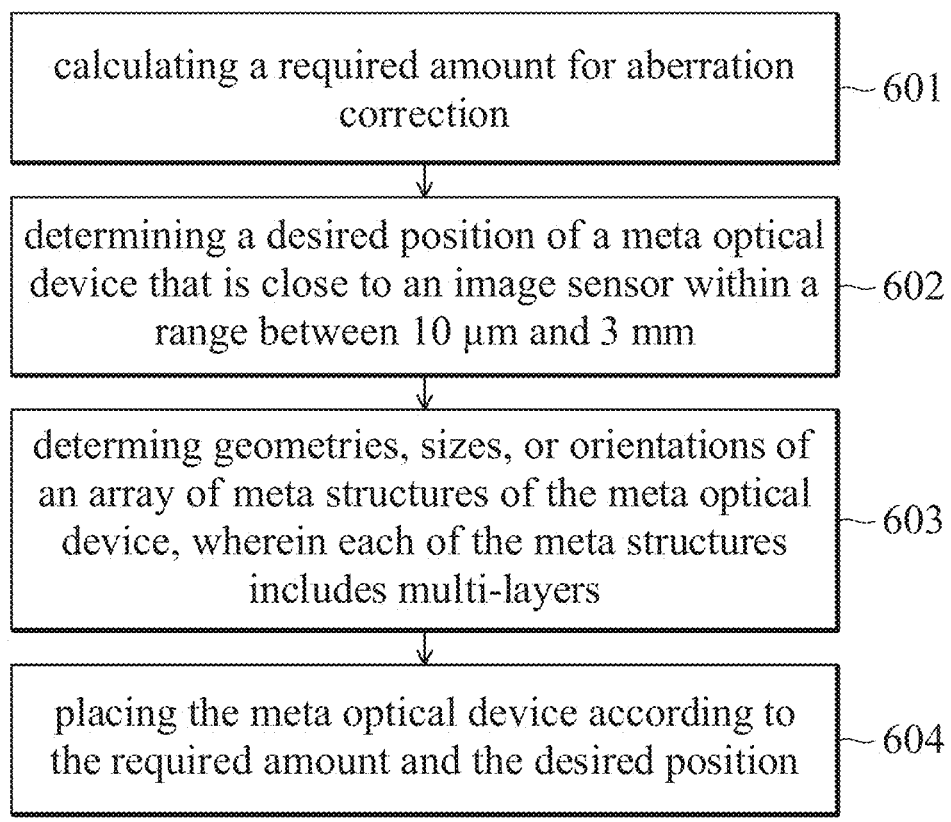
FIG. 6 is a flow chart of the method for aberration correction.

FIG. 6 is a flow chart of the method 600 for aberration correction. The method 600 includes four steps 601-604. In step 601, the method 600 includes calculating the required amount for aberration correction. In step 602, the method 600 includes determining a desired position of a meta optical device (e.g. the meta optical device 100) that is disposed close to an image sensor (e.g. the image sensor 20), wherein the distance between the meta optical device and the image sensor is between 10 μm and 3 mm. The meta optical device includes an array of meta structures, and each of the meta structures includes a plurality of stacked layers including at least a first layer with a first refractive index and a second layer with a second refractive index. The first refractive index and the second refractive index are different. In step 603, the method 600 includes determining and/or adjusting the geometries, the sizes, or the orientations of the meta structures. In step 604, the method 600 further includes placing the meta optical device according to the required amount and the desired position.

As described above, a meta optical device is provided. The meta optical device includes an array of meta structures, and each of the meta structures includes stacked layers with different refractive indices. Due to different refractive indices, both the refraction and the absorption of the incident wave are taken into consideration, and thus not only the image quality is enhanced but also the efficiency is improved. Additionally, the thickness of the multilayer meta structures may be reduced, which is more feasible in manufacturing due the relatively small aspect ratio. Additionally, the shapes of each of the meta structures, the thickness of each layer of each of the meta structures, the number of the layers of each of the meta structures, the difference between the refractive indices, the number of refractive indices, and the arrangement of layers with different refractive indices of the meta structures may be adjusted.

Furthermore, the meta optical device may provide two optical functionalities: phase correction and aberration correction. When the meta optical device is used as a phase corrector, the phase of the incident wave may be modulated. When the meta optical device is used as an aberration corrector, the performance of the image sensor and/or the image quality may be improved. The functionality of the meta optical device may depend on its position relative to the image sensor. The distance between the meta optical device and the image sensor may be less than 3 mm.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A meta optical device disposed inside or above an image sensor, comprising:
   an array of meta structures, wherein each of the meta structures comprises a plurality of stacked layers with a same cross-sectional area, the stacked layers comprising a first layer with a first refractive index, a second layer with a second refractive index, and a third layer with a third refractive index, wherein the second layer is between the first layer and the third layer, a difference between the first refractive index and the second refractive index is between 0.1-2.5, a difference between the second refractive index and the third refractive index is between 0.1-2.5, and a first thickness of the first layer and a third thickness of the third layer are equal,
   wherein when the meta optical device is disposed inside the image sensor, or the meta optical device is disposed above the image sensor within a distance less than 10 μm, the meta optical device provides a function of phase correction,
   wherein when the meta optical device is disposed above the image sensor, and the distance between the meta optical device and the image sensor is between 10 μm and 1 mm, the meta optical device provides the function of phase correction and a function of aberration correction, and
   wherein when the meta optical device is disposed above the image sensor, and the distance between the meta optical device and the image sensor is between 1 mm and 3 mm, the meta optical device provides the function of aberration correction.

2. The meta optical device as claimed in claim 1, wherein the difference between the first refractive index and the second refractive index is between 0.3-2.0.

3. The meta optical device as claimed in claim 1, wherein the difference between the first refractive index and the second refractive index is between 0.5-1.8.

4. The meta optical device as claimed in claim 1, wherein the meta structures comprise a dielectric material.

5. The meta optical device as claimed in claim 1, wherein the second refractive index is greater than the first refractive index and the third refractive index.

6. The meta optical device as claimed in claim 5, wherein the first refractive index is equal to the third refractive index, so that each of the meta structures has two different refractive indices in an alternate arrangement.

7. The meta optical device as claimed in claim 1, wherein the first thickness of the first layer is different from a second thickness of the second layer.

8. The meta optical device as claimed in claim 7, wherein the first thickness is greater than the second thickness.

9. The meta optical device as claimed in claim 1, wherein each of the meta structures has an aspect ratio of less than 10.

10. The meta optical device as claimed in claim 1, wherein each of the meta structures is hollow in a top view.

11. The meta optical device as claimed in claim 1, wherein the meta structures are arranged into an array that is rectangular or hexagonal.

12. The meta optical device as claimed in claim 1, wherein the meta structures comprise different geometries, sizes, or orientations.

13. The meta optical device as claimed in claim 1, wherein the stacked layers further comprise a plurality of odd layers with the first refractive index and a plurality of even layers with the second refractive index.

14. The meta optical device as claimed in claim 1, wherein a total thickness of each of the meta structures is less than 1 μm.

15. An optical system, comprising:
an image sensor, comprising:
a plurality of micro lenses;
a plurality of color filters disposed below the micro lenses; and
a meta optical device disposed above the color filters,
wherein the meta optical device comprises an array of meta structures, each of the meta structures comprises a plurality of stacked layers with a same cross-sectional area, the stacked layers comprising a first layer with a first refractive index, a second layer with a second refractive index, and a third layer with a third refractive index, wherein the second layer is between the first layer and the third layer, a difference between the first refractive index and the second refractive index is between 0.1-2.5, a difference between the second refractive index and the third refractive index is between 0.1-2.5, and a first thickness of the first layer and a third thickness of the third layer are equal,
wherein when the meta optical device is disposed inside the image sensor, or the meta optical device is disposed above the image sensor within a distance less than 10 μm, the meta optical device provides a function of phase correction,
wherein when the meta optical device is disposed above the image sensor, and the distance between the meta optical device and the image sensor is between 10 μm and 1 mm, the meta optical device provides the function of phase correction and a function of aberration correction, and
wherein when the meta optical device is disposed above the image sensor, and the distance between the meta optical device and the image sensor is between 1 mm and 3 mm, the meta optical device provides the function of aberration correction.

16. The optical system as claimed in claim 15, wherein the meta optical device is disposed above the micro lenses and the color filters or between the micro lenses and the color filters.

17. The optical system as claimed in claim 15, wherein a distance between a bottom surface of the meta optical device and a top surface of the image sensor is less than 10 μm.

18. The optical system as claimed in claim 15, wherein a distance between a bottom surface of the meta optical device and a top surface of the image sensor is between 10 μm and 1 mm.

19. The optical system as claimed in claim 15, wherein a distance between a bottom surface of the meta optical device and a top surface of the image sensor is between 1 mm and 3 mm.

* * * * *